US 6,654,332 B2

(12) United States Patent
Coene et al.

(10) Patent No.: US 6,654,332 B2
(45) Date of Patent: Nov. 25, 2003

(54) METHOD FOR GENERATING A BINARY SIGNAL HAVING A PREDETERMINED SPECTRAL SHAPE

(75) Inventors: Willem Marie Julia Marcel Coene, Eindhoven (NL); Job Cornelis Oostveen, Eindhoven (NL); Aloysius Michael Josephus Maria Spruijt, Eindhoven (NL); Paulus Reinier Joannes Van Roosmalen, Eindhoven (NL); Jan Harm De Boer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 154 days.

(21) Appl. No.: 09/929,055

(22) Filed: Aug. 14, 2001

(65) Prior Publication Data

US 2002/0041550 A1 Apr. 11, 2002

(30) Foreign Application Priority Data

Aug. 14, 2000 (EP) .............................. 00202847

(51) Int. Cl.[7] ................................. G11B 5/76
(52) U.S. Cl. .................... 369/59.24; 369/53.31
(58) Field of Search .................. 369/44.13, 47.15, 369/47.16, 47.17, 47.19, 47.35, 53.37, 53.33, 59.25, 59.23, 59.24, 275.3, 275.4, 59.11

(56) References Cited

U.S. PATENT DOCUMENTS 5,682,365 A 10/1997 Carasso et al.

OTHER PUBLICATIONS

K.A. Schouhamer Immink: "Coding Techniques for Digital Recorders", 1991, pp. 247–263 ("Spectral Nulls at Frequencies Other Than Zero, Ch. 10").

Primary Examiner—Paul W. Huber
(74) Attorney, Agent, or Firm—Michael E. Belk

(57) ABSTRACT

The invention relates to a method for generating a primary binary signal having a predetermined spectral shape in a predetermined frequency range, in particular having a notch in the power spectrum in a predetermined frequency range. In order to avoid crosstalk between a primary binary signal and a secondary binary signal it is proposed according to the invention that data-words are modulated into channel-words forming the channel bitstream of the primary binary signal and that the modulation of the data-words is chosen such that the predetermined spectral shape of the channel bitstream of the primary binary signal is achieved by using an evaluation criterion based on a spectral weight function the shape of which is tailored to the spectral extent of the channel bitstream of a secondary binary signal. The invention is in particular useful for generating a primary binary signal which is used in the lead-in area of an optical record carrier where a wobble is used in the secondary binary signal for storing a wobble key. The invention relates further to a device for generating the channel bitstream of a primary binary signal, to a primary binary signal and to a record carrier for storing such a binary signal.

20 Claims, 5 Drawing Sheets

METHOD FOR GENERATING A BINARY SIGNAL HAVING A PREDETERMINED SPECTRAL SHAPE

The invention relates to a method for generating a primary binary signal having a predetermined spectral shape in a predetermined frequency range, in particular having a notch in the power spectrum in a predetermined frequency range. The invention further relates to a device for generating a primary binary signal having a predetermined spectral shape, to a binary signal having a predetermined spectral shape and to a record carrier for comprising such a binary signal.

A record carrier for optically detectable data storage and an apparatus for recording data on such a record carrier are disclosed in U.S. Pat. No. 5,682,365. The record carrier described therein is provided with periodic track variations, also called a "wobble", whose period corresponds to a frequency for which a power spectrum of the digitally coded information substantially exhibits a zero point. When scanned by a beam of radiation, the periodic track variations produce periodic modulation in the reflected beam intensity of a frequency corresponding to the period of the track variations in order to generate a clock signal of a frequency equal to the bit frequency during recording or reproduction. This power spectrum of the primary binary signal, which is the binary signal storing the digitally coded information, thus has a sharp single-frequency notch, i. e. has a zero point at a certain frequency which frequency corresponds to the period of the periodic track variations, i. e. of the wobble signal. According to U.S. Pat. No. 5,682,365 a radial wobble is used in the servo tracks of a disc-shaped optical record carrier to provide a tracking signal.

The wobble signal can be considered as a secondary signal. In U.S. Pat. No. 5,682,365 a sinusoidal wobble is used. Other applications use a phase-modulated wobble to accommodate a secondary binary signal. A '1' channel bit corresponds in that case to a fixed number of wobble periods with positive amplitude (phase 0°), a '0' channel bit corresponds to the same number of wobble periods with a negative amplitude (phase 180°). The spectral shape of the channel bitstream of the secondary binary channel depends on the channel code used. In case the bi-phase code is used (with only two codewords, (+1, −1) and (−1, +1)), the spectrum is given by $2 \sin^2 \omega/2$, with $\omega$ the frequency ($\omega=\pi$ at the Nyquist frequency). For the wobble channel, the spectrum of the secondary binary signal will be positioned centered at the wobble frequency. The extent of the spectrum of the secondary binary signal relative to the wobble frequency is determined e.g. by the chosen fixed number of wobble periods per channel bit.

A single-frequency notch is quite good in the central region around the single frequency of the pure wobble signal since an interference between the secondary binary signal and the primary binary signal at this single frequency is well suppressed. In general, the quality of the secondary signal accommodating a binary information stream, like the phase-modulated wobble signal, is not only determined by the interference on its central frequency, but by the interference over the whole frequency range that is spanned by the power spectral density of the secondary binary signal. This means that a single-frequency notch being quite good with respect to interference in the central frequency region of the PSD still leads to disturbing interference in the exterior regions of the PSD.

It is therefore an object of the invention to provide a method for generating a primary binary signal having a predetermined spectral shape such that interferences between the primary binary signal and the secondary binary signal are suppressed as much as possible in order to be able to detect the secondary binary signal free of disturbances caused by the primary binary signal. Further, it is an object of the invention to provide a corresponding device for generating a primary binary signal, a binary signal having a predetermined spectral shape and a record carrier for comprising such a binary signal.

This object is achieved by a method for generating a primary binary signal as claimed in claim 1. According to this method the primary binary signal comprises a modulation step from data-words into channel-words whereby in general a limited degree of freedom in the choice of the modulation of the data-words is available. This freedom of choice is according to the invention used to generate a primary binary signal having a predetermined spectral shape, in particular having a spectral notch, which is determined via a spectral weight function the shape of which is tailored to the spectral extent of a secondary binary signal such that the secondary binary signal can be accommodated to the spectral shape of the primary binary signal. In particular, the secondary binary signal can be accommodated spectrally at the position of the notch in the power spectrum of the primary binary signal and the width of the notch is determined by the spectral extent of the secondary binary signal. In other words, the shape of the weight function used to determine the spectral shape of the primary binary signal is selected such that the spectral shape of the primary binary signal is adapted to the spectral shape of the secondary binary signal to avoid crosstalk between these two binary signals and to enable read-out and decoding of the secondary binary signal without disturbencies caused by the primary binary signal.

A known single-frequency notch at zero frequency may, however, be additionally employed. This means that the wide-notch, preferably provided according to the invention, can be provided on top of a single-frequency notch around DC. Such a notch around DC is needed in view of DC-control, i.e. for a separation of the information signal from low-frequency disk noise, necessary for control of the slicer level, and in order to avoid interference of the information signal with the servo systems.

A preferred embodiment of the method comprises the steps as claimed in claim 2. According to this embodiment a sum value computed on the basis of candidate channel bitstreams of the primary binary signal is used as a criterion for the determination of the channel-words forming the primary binary signal. Depending on the actual use of the primary binary signal the content of the data-words which are modulated into the channel-words can be selected completely free or has to follow certain restrictions which limit the selection of the channel-words in step a) of this embodiment. Different channel-words are then selected and the sum value for these channel-words is then determined, preferably by a bit-by-bit recursive calculation of a convolution-type of sum, to find the lowest sum value. The channel-word resulting in the lowest sum value is then selected for this given data-word location. These steps are then repeated for several or all data-word locations of the primary binary signal to find the channel-words resulting in the lowest sum values for the respective data-word locations. By use of the weight function in the step of determining the sum value the spectral shape of the primary binary signal can be influenced as intended. The aimed spectral weight function determines the values of the tap-coefficients that are to be used in the evaluation of the convolution-type of sum.

In a further embodiment the set of possible channel-words at a given data-word location is generated by the encoding freedom of the modulation code used either in the choice of merging bits, (EFM-modulation for CD) or in the use of substitution tables (EFMPlus-modulation for DVD) or in the use of extra control bits (17PP, Parity-Preserve modulation of the rewritable format of DVR) which are used in the channel modulation. In general, the encoding freedom of a modulation code used depends on the application of the primary binary signal, i. e. in certain applications the content of data symbols at a given data-word location is completely free whereas in other applications the content of data symbols is fixed. In an application where the content of the data symbols is completely free the selection of the channel-word in step a) could also be performed by a random selection of the value of the data symbol. The set of possible channel-words at a given data-word location can thus also be generated by variation of the data-words.

In a preferred embodiment of the invention the weight function is a Gaussian function. Such a weight function is preferably used if the power spectrum of the secondary binary signal has a shape that can satisfactorily be approximated by a Gaussian function. The parameters of the Gaussian function can be determined according to the spectral extent of the secondary binary signal.

Another embodiment of the invention as claimed in claim 8 provides a method of determining the sum value by bit-by-bit recursive calculation. This recursive calculation is quite a simple method of determining the criterion, which is the sum value, for the selection of the channel-word at a given data-word location. This calculation is performed bit-wise which means that the sum value is calculated bit-by-bit for all bit positions in the channel-word, e. g. if the channel-word has 17 bits (as in the case for the EFM code, with words of 14 bits concatenated by 3 merging bits) this step is performed 17 times. In the tap-coefficients of the convolution-filter used therein the parameters of the weight function, in this case of the Gaussian function, are included to determine the spectral shape of the primary binary signal.

According to further embodiments of the invention as claimed in claims 9 and 10 the primary binary signal is used in the servo-tracks or in the lead-in area of an optical record carrier like a CD or DVD.

In a preferred embodiment the primary binary signal is used in the lead-in area of an optical record carrier where the secondary binary signal is a wobble signal realized by wobbling the information track and stored in a wobble channel. According to this embodiment the weight function is determined such that the power spectrum of the wobble signal fits in the spectral notch generated in the primary binary signal and the wobble channel is used for storing data in the lead-in area of the record carrier. Preferably—as claimed in claim 11—the wobble-channel is used as a side-channel that contains a wobble key for decryption of data stored in the data area of the record carrier, preferably in a Read Only Memory disc (ROM). Such a wobble key cannot be copied since the wobble channel is created in the mastering step of a ROM disc. A recordable disc or a rewritable disc can also have a wobble, but that is in view of address information and/or clock generation for the write-process. Such a wobble is thus always different from the wobble in the ROM disc. The wobble in the ROM disc contains information that is coupled to the content of the disc, so that the wobble key is needed for decryption.

A significant part of commercially available CD-audio drives use a 3-beam set-up for radial tracking instead of the Radial Push-Pull method. The Radial Push-Pull method yields a qualitatively good wobble signal because of the subtraction of the signals detected on the two detector halves, aligned in the direction normal to the track direction (radial direction) in the exit pupil of the objective lens. The subtraction operation effectively cancels uniform noise contributions that are present on both detector halves. In contrast the Central-Aperture (CA) signal of one of the side-spots of the 3-beam set-up is of much worse quality in general. Part of the noise is due to the interference with the EFM-data of the primary binary signal. An EFM-pattern can have a long-range periodicity with a period close to that of the wobble period which is in one practical application 196 EFM-bits. In such case it is difficult to distinguish a contribution of the wobble-effect from a long-range code-effect that can occur with some probability. In the spectrum the interference of signals can directly be seen if the signals have significant content at the same spectral frequency range. Therefore significant content of the EFM-code in the spectral range of the wobble is a noise source for the secondary binary signal accommodated in the wobble channel, and due to the 3-beam side spot detection, there is already a large portion of low-frequency noise present. The method according to the invention, however, prevents EFM disturbence on top of the wobble signal and the normal noise when used for generating the primary binary signal in the lead-in area of an optical record carrier, wherein the secondary binary signal is a wobble signal.

Further embodiments of the inventions may be found in further dependent claims.

The invention is also embodied in a device for generating a primary binary signal as claimed in claim 14, in a binary signal as claimed in claim 15 and a record carrier for storing a binary signal as claimed in claim 16. Preferably the record carrier is an optical record carrier like a CD or DVD, especially a ROM-type disc, having a lead-in area comprising a wobble channel used for storing a wobble key. It shall be understood, that these devices, the method for decoding, the binary signal and the record carrier can be further developed and that there are further embodiments thereof, which further developments and further embodiments are identical or similar to those described above with reference to the method and laid down in the subclaims dependent on claim 1.

The invention will be described in more detail with reference to the drawing, in which.

Figure 4:
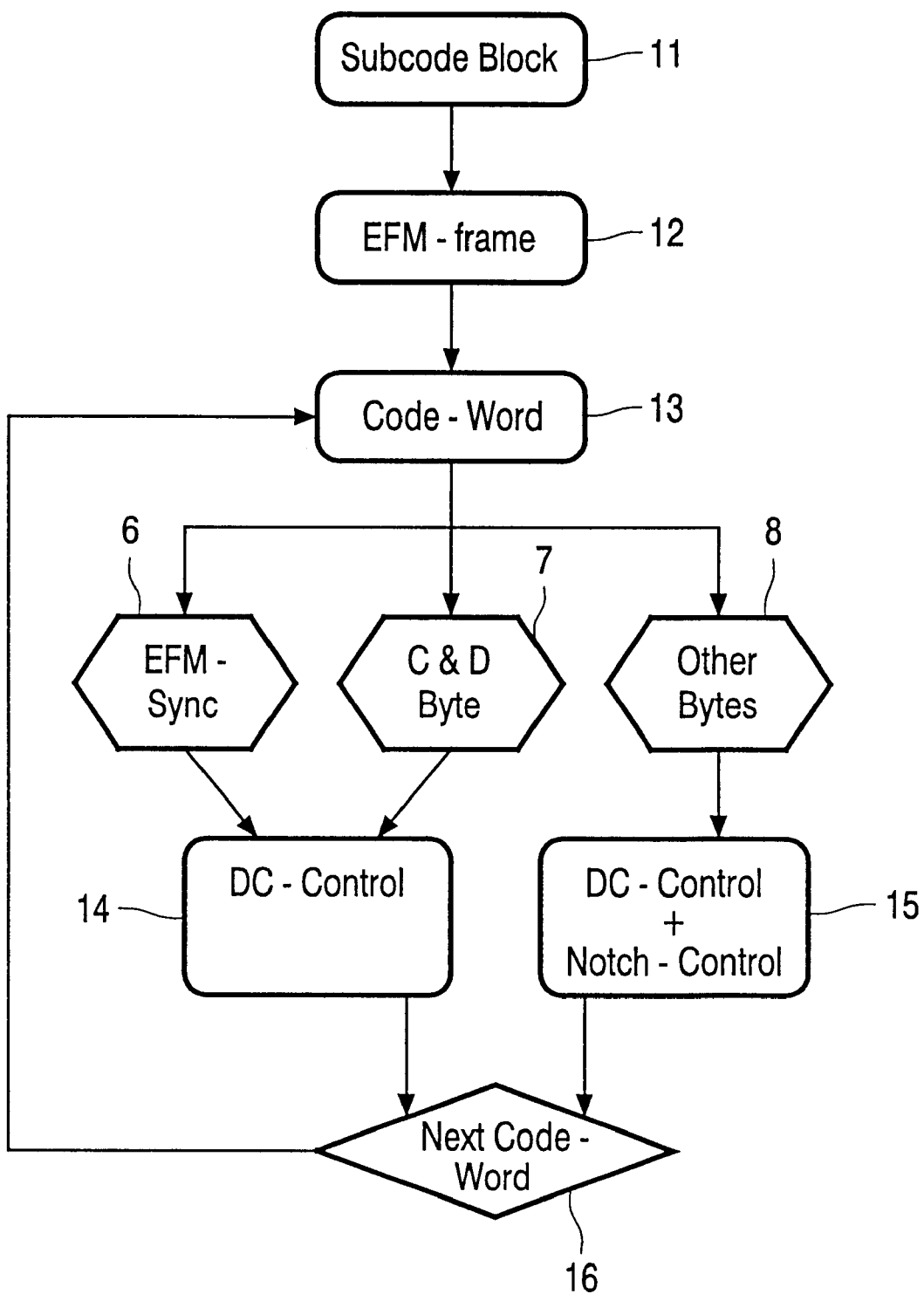
Figure 5:
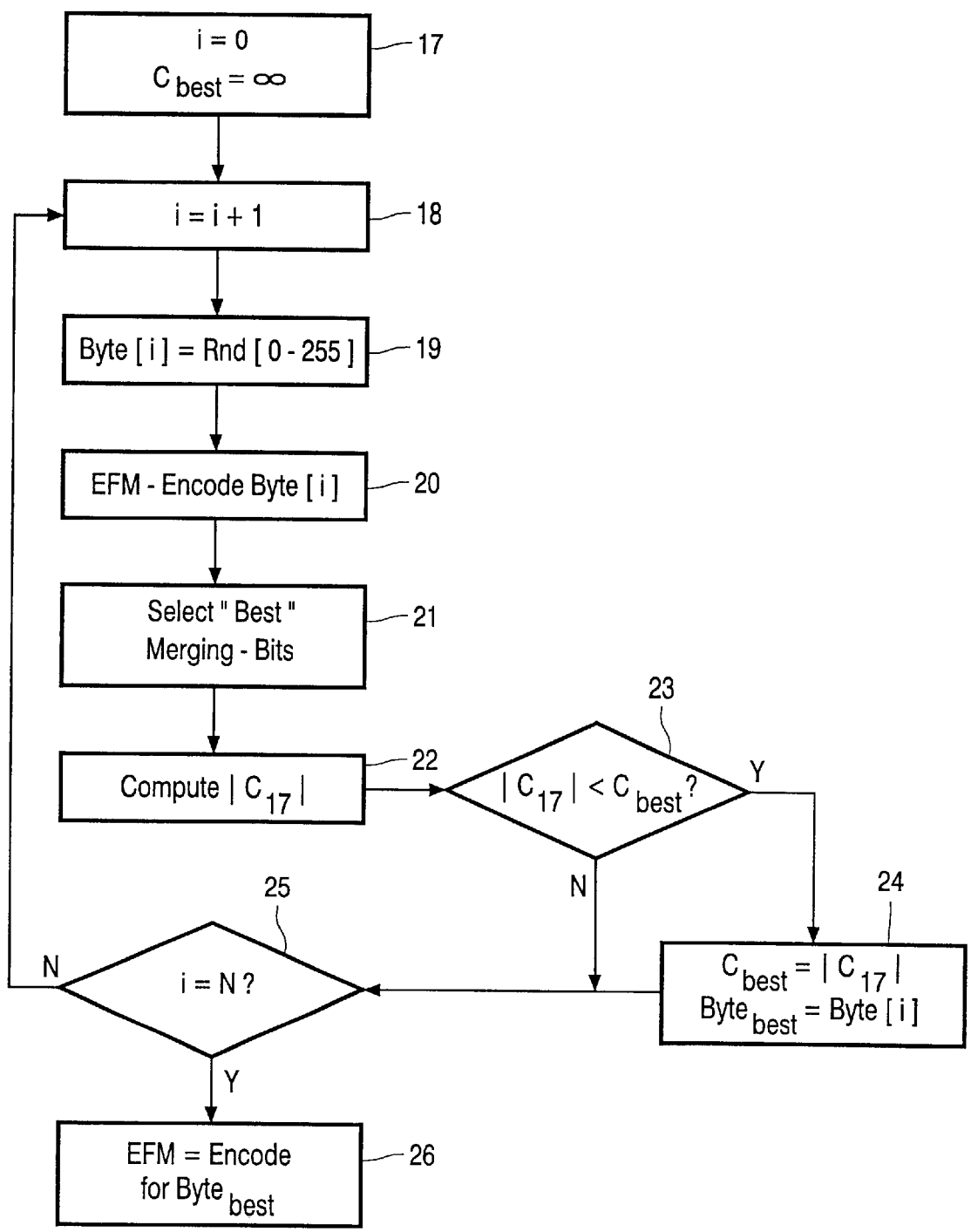
Figure 6:
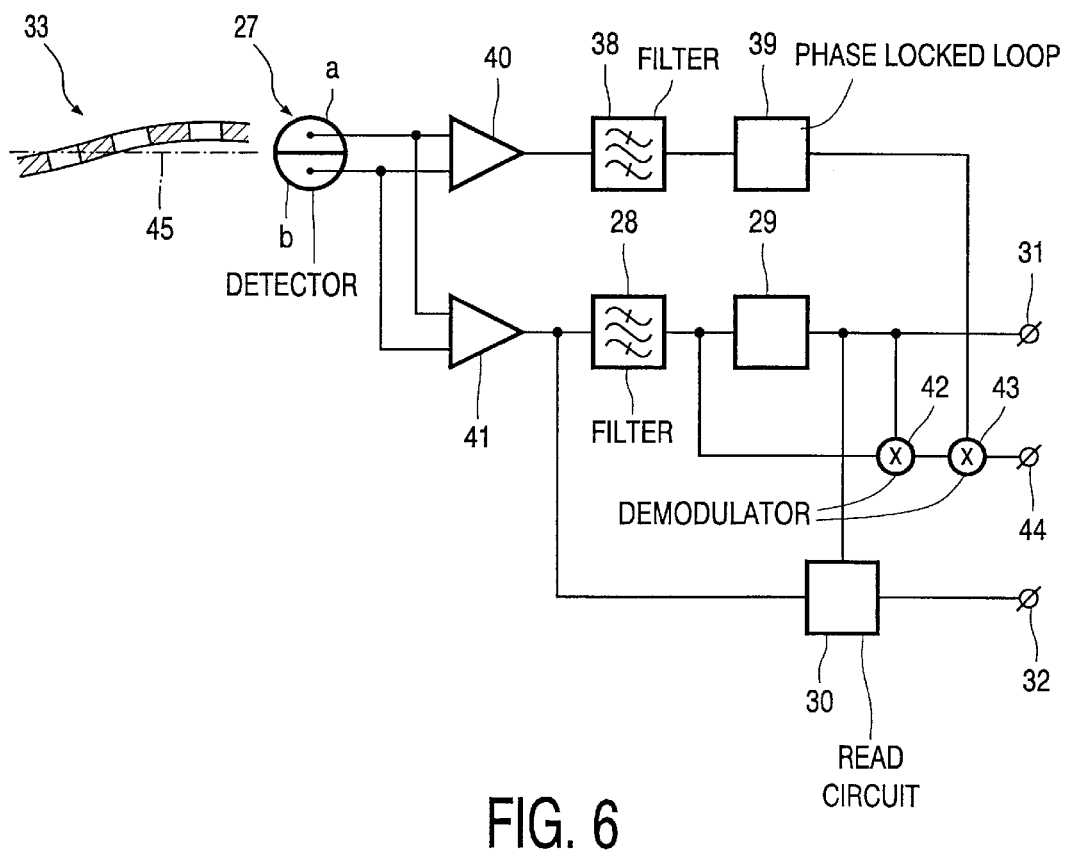
Figure 7A:
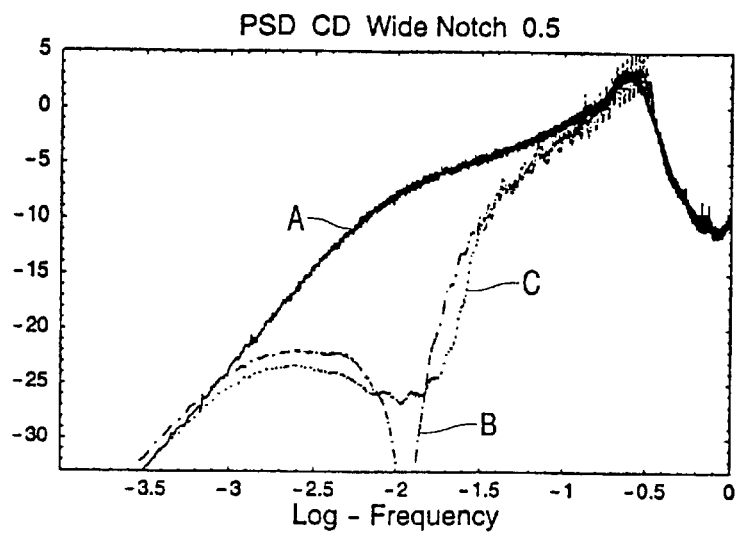
Figure 7B:
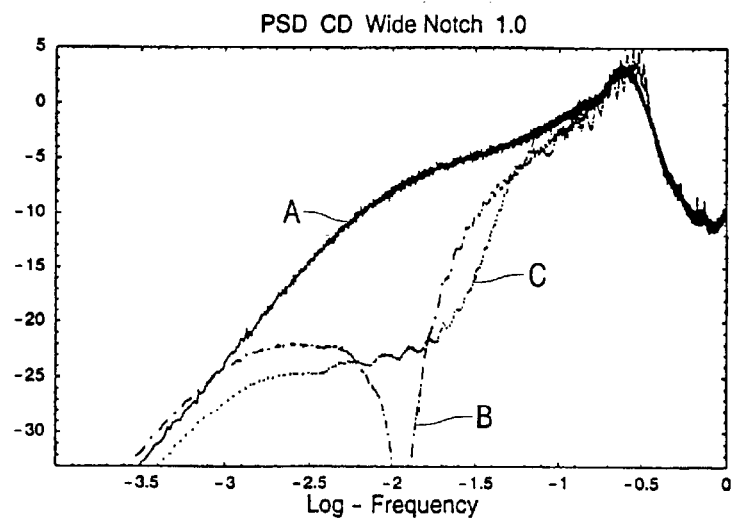
Figure 7C:
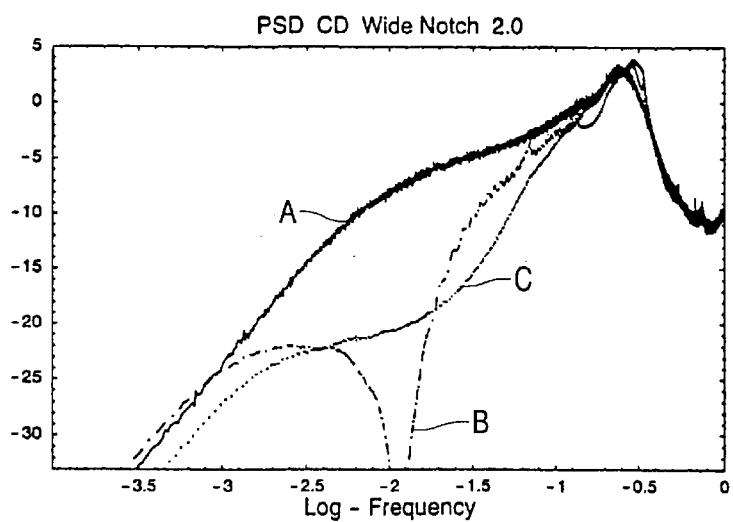

FIG. 4 shows a flow chart describing the method for generating a binary signal according to the invention, FIG. 5 shows a flow chart describing the method of determining a channel-word at a given data-word location according to the invention, FIG. 6 shows a device for reading a binary signal according to the invention and FIGS. 7a to 7c show a comparison of power spectra for a binary signal without notch, having a single-frequency notch and having a wide notch according to the invention for different parameters.

Figure 1:
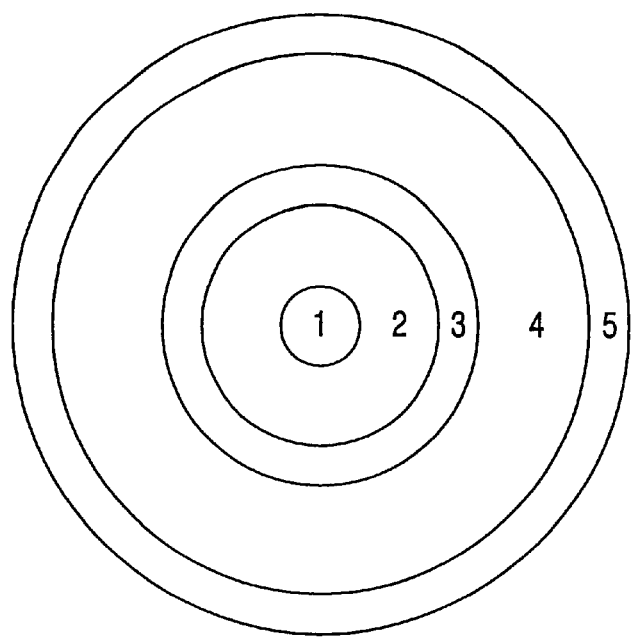
FIG. 1 shows an embodiment of a record carrier according to the invention.

FIG. 1 shows an embodiment of an optical record carrier, e. g. a CD or a DVD, according to the invention. Such a record carrier in general comprises a center hole 1, a clamping area 2, a lead-in area 3, a program area 4 and a lead-out area 5. The program area 4 is used in general to store the actual data, e. g. audio, video or other data and other information like subcode information, while the lead-in area is used in general for storing the table of contents (TOC) including starting times of tracks, total time of the disc, total number of tracks and other general information of the disc.

Figure 2:
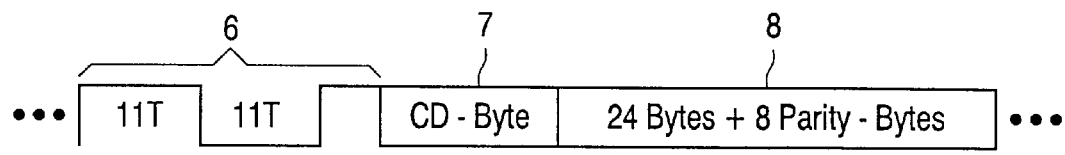
FIG. 2 shows the format of an EFM-frame used on such a record carrier.

The general format of CD is based on subcode-blocks, each subcode-block consisting of 98 EFM-frames. The format of EFM-frames used in CD-audio is shown in FIG. 2. Such an EFM-frame consists of a fixed synchronization pattern 6, a control and display symbol 7 and a data and parity portion 8 including 24 data symbols and 8 parity symbols. This format is used for the EFM-frames in the lead-in area 3 as well as in program area 4 of the disc. While in the program area 4 the content of the data and parity portion 8 is determined by the information to be stored on the disc the content of this portion 8 can be determined completely free in the lead-in area 3. In the lead-in area 3 only the content of the synchronization portion 6 and of the control and display portion 7 is fixed or determined by certain information to be stored therein.

Figure 3:
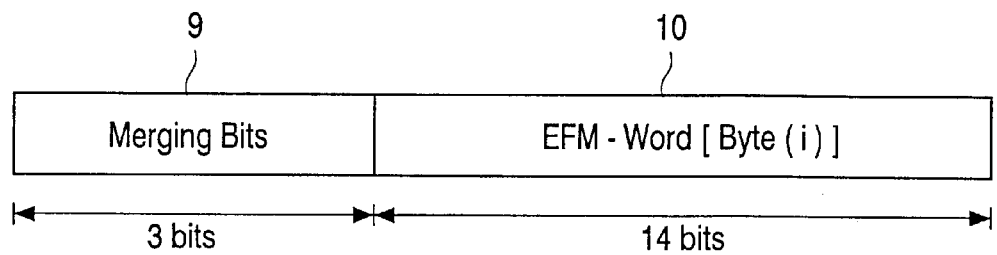
FIG. 3 shows the format of a channel-word used in such EFM-frames.

The format of a channel-word used for optical recording of information is shown in FIG. 3. A channel-word consists of 17 channel bits of which three merging bits 9 are used for DC-control. The other 14 bits comprise the EFM-word which are actually formed from the data-word consisting of 8 bits in the modulation step and which will also be referred to as byte [i] in the following. In the program area 4 the content of the EFM-word 10 is determined by the content of the data-word. The freedom in the Runlength Limited (RLL) coding is then reserved for DC-control only by selecting appropriate merging bits 9 for EFM (or the use of appropriate substitution tables in EFM-Plus as used in the DVD-format). However, in the program area, it is also possible to use part of the encoding freedom of the RLL code that is normally used for DC-control only, for the generation of a spectral notch of a certain spectral extent. In contrast in the lead-in area 3 the selection of the EFM-words 10 in the data and parity portion 8 is completely free which freedom is used according to the invention to generate a binary signal in the lead-in area 3 having a predetermined spectral shape. This freedom in choice of the 17 bits of channel-words used in the data and parity portion 8 in the lead-in area 3 is then shared between DC-control and the generation of a predetermined shaped, e. g. having a wide notch in the power spectrum.

FIG. 4 shows a flow chart of a method for generating a binary signal according to the invention. Therein the iterative flow of code-words in an EFM-frame 12 that is part of subcode-block 11 is shown. Three different cases of code-words can be distinguished: the synchronization pattern 6 for an EFM-frame, the control-and-display byte 7 (C&D byte) and the data bytes 8, all preceded by three merging bits. In the first two cases of code-words 6, 7 only DC-control 14 is aimed at, because the value of the sync-pattern 6 and of the C&D byte 7 is fixed, due to timing information written in the P&Q sub-channels. For all bytes 8 following the C&D byte 7, a joined DC-control and notch-control 15 is applied. This procedure is recursively repeated for all code-words of an EFM-frame (step 16).

The procedure to be followed for the notch-control (step 15 in FIG. 4) on a byte-by-byte basis is shown in the flow chart of FIG. 5. For each byte of the data and parity portion 8 of an EFM-frame (see FIG. 2) a random selection of a fixed number N of byte-values is made. At first, in step 17 the counter i for counting the N selections is set to zero. Further, the sum value $C_{best}$ is set to a maximum value, reflecting infinity. This sum value will be used as criterion which of the byte-values to select in order to result in the intended spectral notch. Next, in step 18 the counter i is increased by one. Thereafter, the byte-value for byte i is randomly selected in step 19. This selected byte-value is EFM-encoded in step 20 which step of encoding is unequivocal into an EFM-word (10 in FIG. 3). This EFM-word has to be preceded by three merging bits. The selection of the merging bit pattern is done in step 21 for optimum DC-control in terms of the Digital-Sum-Value (DSV) at the end of the 17-bit channel sequence. The computation of the actual DSV depends on the previous DSV-value at the bit position just before the 17-bit sequence and on the polarity of the bit at that position. Additionally, the known Runlength Limited (RLL) constraints should always be preserved.

Next, the notch-criterion for the 17-bit channel sequence is evaluated in step 22. The initial value $C_0$ of the criterion at the bit-position just before the 17-bit sequence is used as input. $C_0$ has a value 0 at the starting point of the notched EFM-sequence. The notch-criterion is computed bit-by-bit starting from the initial value $C_0$ up to the last bit of the 17-bit channel sequence for the selected byte out of the set of random byte values. The value at the end of the 17-bit channel sequence is denoted as $C_{17}$. The bit-by-bit recursion in step 22 is performed via a convolution sum of the previous bit-values with a filter with taps $d_j$ according to $$C_k = 1 + C_{k-1} + b_k \sum_{j=1}^{M} d_j b_{k-j}$$

wherein k is a counter of the bit position in the channel-word, j is a counter used in the evaluation of the sum value, $b_k$ is the bipolar bit value (+1 or −1) of the bit at position k in the channel-word (of the bipolar RLL (runlength-limited) channel bitstream) and M is the limit value for the evaluation of the sum, which is e. g. related to the inverse width of the weight function.

For the case of a notch with a Gaussian profile centered at scaled frequency $V_N 1$ and a width of σ the tap-coefficients $d_j$ of the filter are $$d_j = 2 \cos(2\pi j v_N) \exp(-2\pi^2 \sigma^2 j^2)$$

For each byte of the set of random byte-values the notch-criterion is evaluated and the byte-value with the best (=lowest) value for this criterion (steps 23, 24) is selected to be assigned in the notched EFM channel bit stream at this given data-word location. This recursive computation to find the best byte for a given data-word location is repeated N times (step 25) whereafter this $Byte_{best}$ is EFM-encoded (step 26). The procedure is then repeated for the next byte in the EFM-frame, and the initial values for $DSV_0$ and $C_0$ are reloaded from the corresponding values $DSV_{17}$ and $C_{17}$ at the last bit-position of the previous 17-bit sequence.

In an advantageous embodiment the value N is set to N=32. The number of significant taps in the filter with coefficient $d_j$ depends on the width of the Gaussian notch.

In general the wide-notch criterion at bit position k, integrated over weight function can also be denoted as $$C_K = \int |S_k(v)|^2 |W(v)| dv$$

wherein $$Sk(v) = \sum_{j=-\infty}^{K} b_j \exp(2\pi ijv)$$

A single-frequency criterion can be used to generate a binary signal having a sharp notch at one single frequency and is known from "CODING TECHNIQUES FOR DIGITAL RECORDERS", Kees A. Schouhamer Immink, Prentice Hall International, 1991, pages 247 to 263. For a wide notch on the other hand, a weight function W is used to determine the spectral shape of the wide-notch. The wide-notch criterion $C_k$ can be calculated by the above described bit-by-bit recursion in which in general holds:

$$d_j = a_j + a_{-j}$$

and $$a_j = \int W(v) \exp(2\pi ijv) dv$$

If a binary signal having a Gaussian shaped wide notch at given frequency $ny_N 2$ shall be generated the weight function can be selected as $$W(v) = (1/\sqrt{2\pi}\sigma) \exp(-(v-v_n)^2/2\sigma^2).$$

The parameter $a_j$ used in the bit-by-bit recursion will then result in $$a_j = \exp(2\pi ijv_N) \exp(-2\pi^2\sigma^2 j^2)$$

It is to be denoted here that the Gaussian function is one of several examples which can be used as a weight function. In general the shape of the weight function shall be selected such that the shape of the power spectrum of the primary binary signal is adapted to the power spectrum of the secondary binary signal in order to avoid interference from the primary signal to the secondary signal. In general any shape for the weight function is possible to be used, the appropriate selection depends on the shape of the power spectrum of the secondary signal. A Gaussian function is advantageous since it leads to a simple analytical formula for the tap-coefficients $a_j$, obtained after Fourier transformation. Other functions can however also be used e. g. a Lorentzian distribution.

The general arrangement of an apparatus for manufacturing a record carrier, of an apparatus for recording information in a record carrier and an apparatus for reading such an inscribed record carrier using the Radial Push-Pull method are shown in U.S. Pat. No. 5,682,365.

In this connection it shall be pointed out that the invention is not limited to the generation of binary signals for use in the lead-in area of an optical record carrier. The invention can further be used in other areas of different record carriers, e. g. in the servo-tracks of an optical record carrier where a wobble signal is used to obtain a radial tracking signal. Further, the invention can be used for other record carriers like digital tapes and, in general, in all applications where a crosstalk between two binary signals shall be prevented. Further, the invention can also be applied for any modulation code that is used for the secondary binary signal, with for each a characteristic spectral extent.

FIG. 6 diagrammatically shows a device for scanning an information carrier D. The device has drive means 47 for rotating the information carrier D and a read head 27 for reading the tracks on the information carrier. The read head 27 comprises an optical system of a known type intended for generating a light spot 28 focused on a track of the information carrier by means of a light beam 29 guided by optical elements such as a collimator lens 39, for collimating the light beam, and an objective lens 40, for focusing the light beam. This light beam 29 is produced by a radiation source 41, for example an infrared laser diode having a wavelength of 780 nm and an optical power of 3 mW. The read head 27 further includes an actuator adapted to focus the light beam 29 onto the information carrier and a tracking actuator 30 for the fine positioning of the light spot 28 in a radial direction in the center of the track. In addition, following the track with the laser beam can also be achieved by varying the position of the objective lens 40. After being reflected from the information carrier the light beam 29 is detected by a detector 42 of a known type, for example a quadrant detector, which generates detector signals 31 including a read signal, a tracking error signal, a focus error signal, a synchronizing signal and a lock-in signal. For this purpose, use can be made of, for example, a beam splitting cube 43, a polarizing beam splitting cube, a pellicle or a retarder.

The device includes tracking means 32 coupled to the read head 27 to receive the tracking error signal from the read head 27 and to control the tracking actuator 30. During reading the read means 34 receive the read signal. The read signal 44 is subsequently transferred to and received by the organization means 46. In these organization means 46 the read signal is demodulated. The method of demodulating obviously depends on the method by which the data has been modulated. The device further includes an address detector 35, for detecting the addresses and the Disc Info present in the header fields, and positioning means 36 for the coarse positioning of the read head 27 in a radial direction of the track. After error correction in the error correction means 45 the error-corrected demodulated signal 48 is available at the output for further processing.

The device further includes a system control unit 37 adapted to receive commands from a controlling computer system or from a user and to control the device by means of control lines 38, for example a system bus connected to the drive means 26, the positioning means 36, the address detector 35, the tracking means 32 and the read means 34. For this purpose, the system control unit 37 includes a control circuit, for example a microprocessor, a program memory and control gates for carrying out the processes as described hereinafter. The system control unit 37 may also be implemented in a state machine in logic circuits.

In another embodiment the device may include, in addition to the read means 34, write means for forming optically readable marks on an information carrier of a recordable type, which enables the device to perform both read functions and recording functions.

An identical or similar apparatus as shown will be used in accordance with the invention for reading and/or recording if the binary signal is generated according to the invention and as described above.

In FIGS. 7a to 7c power spectra of the primary binary signals without notch (A), with a single frequency notch at a certain frequency (B) and with a wide notch in a certain frequency range (C) are shown. In this example the frequency where the notch is employed is 22,05 kHz which corresponds to the frequency of a wobble signal used in the lead-in area of an optical record carrier for storing a wobble key. The frequency axis of FIGS. 7a, 7b, 7c is scaled to half of the EFM-frequency which is 4,32 MHz. For displaying purposes the logarithm of this frequency is taken and displayed. The difference between the three spectra C shown in FIGS. 7a, 7b, 7c is the width of the notch, controlled via the parameter σ of the Gaussian weight function, i. e. the weight function used during the generation of the binary signal is different. Compared to the power spectrum B having a single frequency notch the power spectrum C having a wide notch has less surpression at the central frequency area, but an improved surpression in the rest of the spectrum. Additionally a single-frequency notch in the zero-frequency area is provided in all power spectra.

The invention is not limited to the above described examples but is also inherent in other embodiments not shown or disclosed herein. The invention may further also be used in apparatuses or record carriers for the storage of digitally coded information.

What is claimed is:

1. Method for generating a primary binary signal having a predetermined spectral shape in a predetermined frequency range, in particular having a notch in the power spectrum in the predetermined frequency range, wherein data-words are modulated into channel-words forming a channel bitstream of the primary binary signal and wherein modulation of data-words is chosen such that the predetermined spectral shape of the channel bitstream of the primary binary signal is achieved by using an evaluation criterion based on a spectral weight function the shape of which is tailored to the spectral extent of the channel bitstream of a secondary binary signal.

2. Method according to claim 1, comprising the steps of
   a) selection of a channel-word out of a set of possible channel-words that can be associated at a given data-word location,
   b) determining a sum value for the channel-word as criterion for the selection of the channel-word,
   c) repeating steps a) to c) several times by selecting different channel-words and comparing the sum values for the different channel-words and
   d) selecting the channel-word resulting in the lowest sum value in step c).

3. Method according to claim 2, wherein the sum value is determined by bit-by-bit recursive calculation of a convolution sum with tap-coefficients derived from using the spectral weight function.

4. Method according to claim 2, wherein the set of possible channel-words at a given data-word location is generated by the encoding freedom of the modulation code used, either in the choice of merging bits, or in the use of substitution tables or in the use of extra control bits which are used in the channel modulation.

5. Method according to claim 2, wherein the set of possible channel-words at a given data-word location is generated by variation of the data-words over a set of possible values.

6. Method according to claim 2, wherein steps a) to d) are repeated for several or all allowed channel-word selections for a given data-word location in the binary signal.

7. Method according to claim 1, wherein the weight function is a Gaussian function.

8. Method according to claim 2, wherein the determination of the sum value by bit-by-bit recursive calculation of the value $$C_k = 1 + C_{k+1} + b_k \sum_{j=1}^{M} d_j b_{k-j}$$

wherein
   C is the sum value,
   k is a counter of the bit position in the channel-word,
   j is a counter used in the evaluation of the sum value,
   $b_k$ is the bipolar bit value of the bit a position k in the channel-word,
   M is the limit value of the evaluation of the sum and
   $d_j$ is a filter coefficient $$d_j = 2 \cos(2\pi j v_n) \exp(-2\pi^2 \sigma^2 j^2)$$

wherein
   is the frequency around which the spectral shape shall be determined and σ is the standard deviation of the weight function.

9. Method according to claim 1, wherein the primary binary signal is used in a lead-in area of an optical record carrier and the evaluation criterion is dynamically determined in accordance with which area of the optical record carrier is being used.

10. Method according to claim 9, wherein the secondary binary signal is a wobble signal realized by wobbling the information track and stored in a wobble channel, wherein the weight function is determined such that the power spectrum of the wobble signal fits in the spectral notch generated in the primary binary signal and wherein the wobble channel is used for storing data in the lead-in area of the record carrier.

11. Method according to claim 10, wherein a wobble key for decryption of data stored in the data area of the record carrier is stored in the wobble channel.

12. Method according to claim 10, wherein the weight function is determined such that interferences between the wobble channel and the primary binary signal are prevented.

13. Method according to claim 1, wherein the weight function is determined such that the power spectrum of the primary binary signal has a wide notch at a predetermined range of frequencies to which the secondary binary signal can be accommodated spectrally.

14. Device for generating a channel bitstream of a primary binary signal having a predetermined spectral shape in a predetermined frequency range, in particular having a notch in a power spectrum in the predetermined frequency range, wherein data-words are modulated into channel-words forming the channel bitstream of the primary binary signal and wherein modulation of data-words is chosen such that the predetermined spectral shape of the channel bitstream of the primary binary signal is achieved by using an evaluation criterion based on a spectral weight function having a shape which is tailored to a spectral extent of the channel bitstream of a secondary binary signal and wherein the evaluation criterion is dynamically determined using a bit-by-bit recursive calculation of a plurality of channel words to select a single channel word based on the spectral weight function.

15. Primary binary signal having a predetermined spectral shape in a predetermined frequency range, in particular having a notch in a power spectrum in the predetermined frequency range, wherein data-words are modulated into channel-words forming a channel bitstream of the primary binary signal and wherein modulation of data-words is chosen such that the predetermined spectral shape of the channel bitstream of the primary binary signal is achieved by using an evaluation criterion based on a spectral weight function a shape of which is tailored to a spectral extent of the channel bitstream of a secondary binary signal.

16. A record carrier for the primary binary signal according to claim 15, wherein the evaluation criterion employs a dynamic selection of the spectral weight function for the channel bitstream of the secondary binary signal according to which area of the record carrier is currently being used.

17. Record carrier according to claim 16, wherein the record carrier is an optical record carrier and wherein the primary binary signal is used in the lead-in area of the optical record carrier.

18. Record carrier according to claim 17, wherein the secondary binary signal is a wobble signal realized by wobbling the information track and stored in a wobble channel and wherein the wobble channel is used for storing data in the lead-in area of the record carrier.

19. The primary signal of claim 15 further comprising the evaluation criteria employing a bit-by-bit recursive calculation using coefficients from the spectral weight function.

20. The primary signal of claim 15 wherein a single channel-word is selected from a plurality of a possible channel-words that can be associated at a given data-word location and a sum value for the single channel-word is used as criterion for selection of the single channel-word.

* * * * *